Jan. 6, 1970　　　　H. VOLBERDING　　　　3,487,884
BULLDOZER ASSEMBLY

Original Filed March 4, 1966　　　　　　　　4 Sheets-Sheet 1

INVENTOR
HENRY VOLBERDING

BY McCarthy, Depaoli & O'Brien

ATTORNEY

Jan. 6, 1970  H. VOLBERDING  3,487,884
BULLDOZER ASSEMBLY
Original Filed March 4, 1966  4 Sheets-Sheet 2
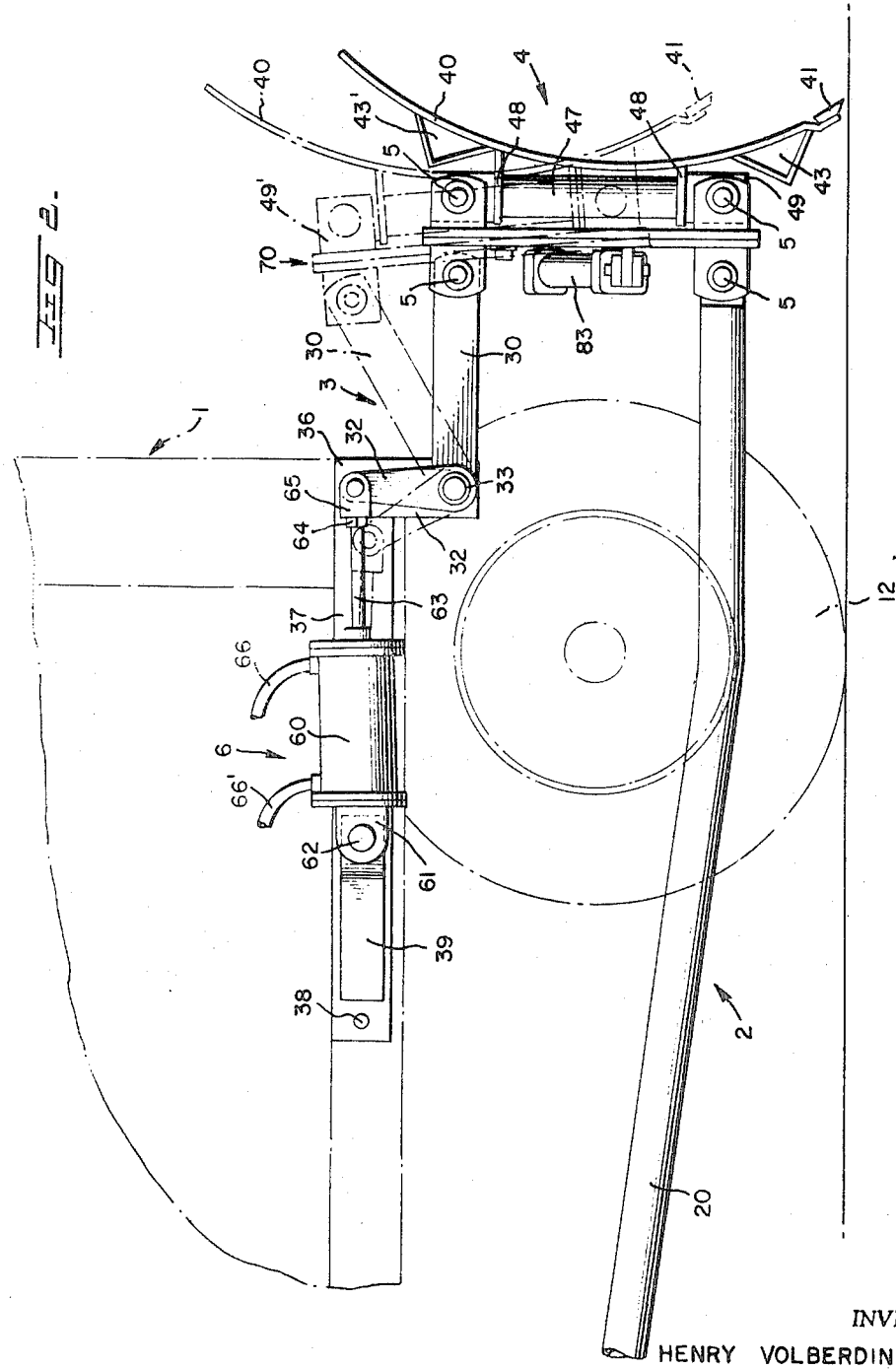
INVENTOR
HENRY VOLBERDING
BY McCarthy, Depaoli & O'Brien
ATTORNEY

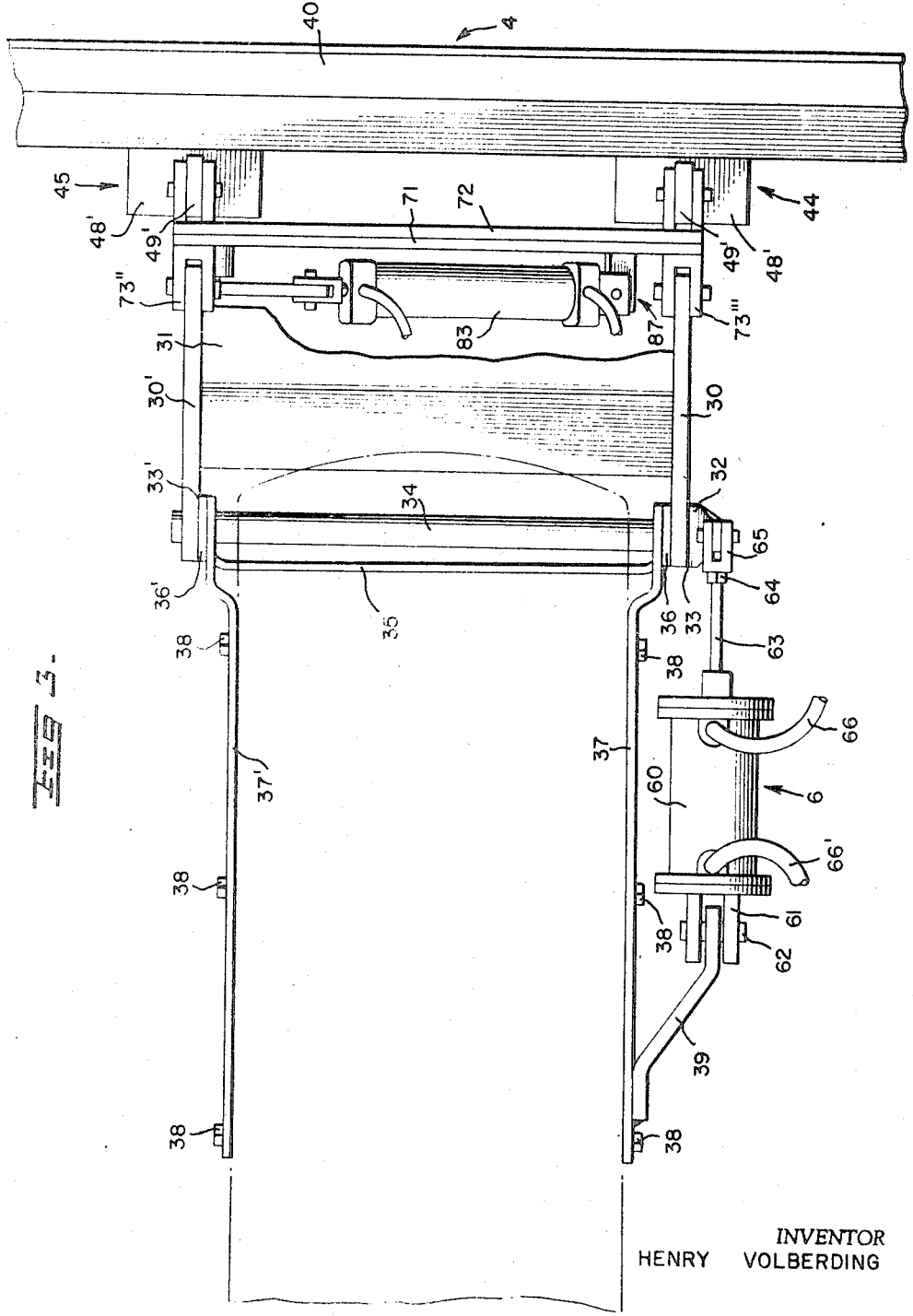

Jan. 6, 1970     H. VOLBERDING     3,487,884
BULLDOZER ASSEMBLY
Original Filed March 4, 1966     4 Sheets-Sheet 4
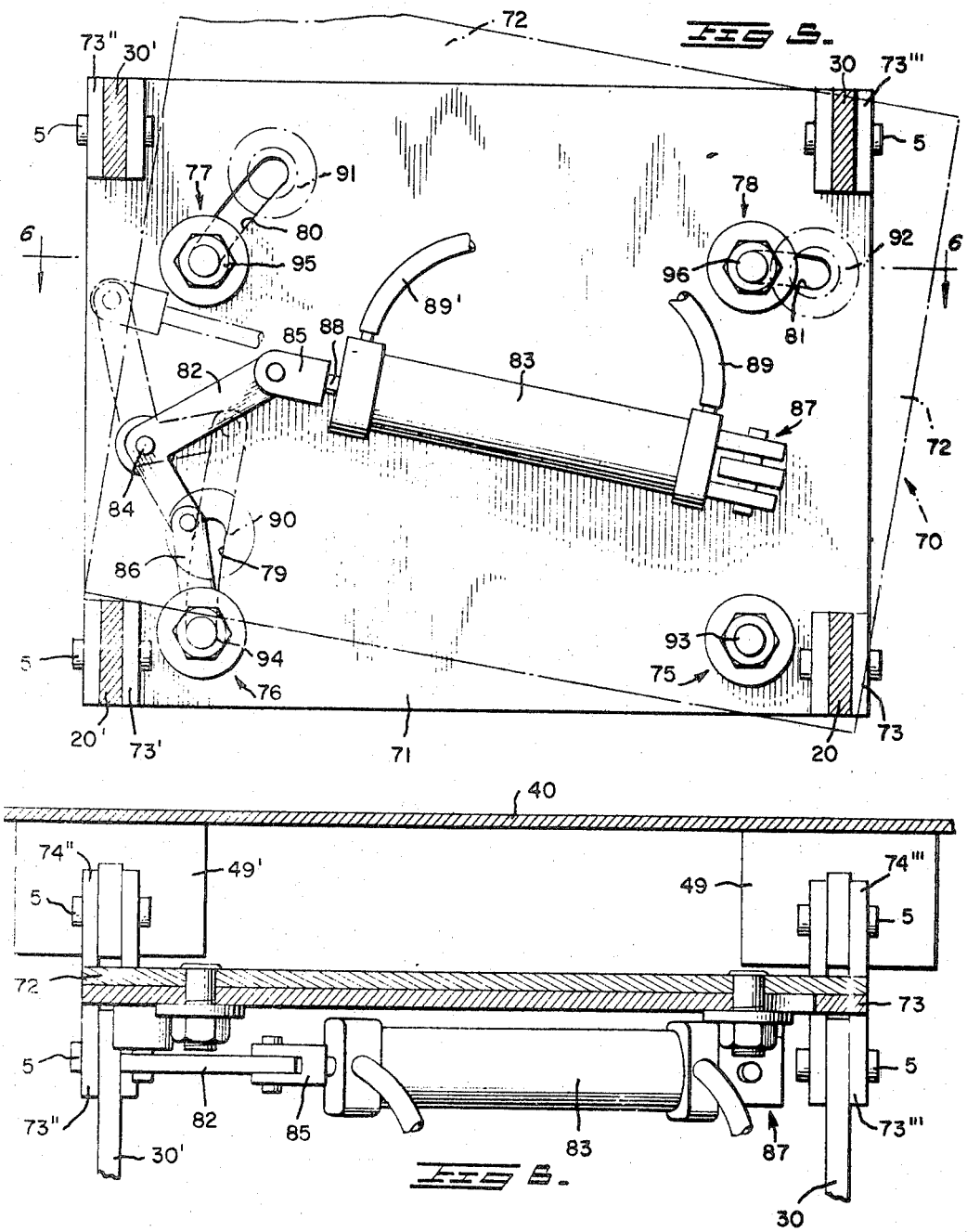
INVENTOR
HENRY VOLBERDING
BY *McCarthy, Depaoli & O'Brien*
ATTORNEY

United States Patent Office 3,487,884
Patented Jan. 6, 1970

3,487,884
BULLDOZER ASSEMBLY
Henry Volberding, Elba Rte., Akron, Colo. 80720
Continuation of application Ser. No. 531,928, Mar. 4, 1966. This application Feb. 17, 1969, Ser. No. 802,736
Int. Cl. E02f *3/85*
U.S. Cl. 172—803                          10 Claims

ABSTRACT OF THE DISCLOSURE

A bulldozing assembly for a tractor comprising a pair of longitudinal push arms on the sides of the tractor attached to a dozer blade at the bottom of a pair of vertical blade standards on the back of the blade, a pair of operating arms pivotally attached to the top end of the blade standards, the operating arms being connected at their rearward ends to a traverse rockshaft, and further connected through a rockshaft arm which contols the action of the blade by hydraulic means. Also provided are means disposed between the blade standards, push arms and operating arms to control tilting of the blade, the tilting means comprising a pair of plates in face-to-face relationship which are pivoted at one corner and provided with hydraulically operated lever means to cause the blade to tilt in the manner desired.

---

This application is a continuation of applicant's earlier filed application, Ser. No. 531,928, filed on Mar. 4, 1966, and now abandoned.

This invention relates to bulldozer implements and more particularly, to an improved construction of a bulldozer assembly for use on tractors and the like.

Various types of bulldozing apparatus are well known in the art including such apparatus for use on wheeled vehicles such as farm tractors. The bulldozing units known heretofore have not been entirely satisfactory for their intended use, however, because of their relatively complicated construction and instability which have been conducive to periodical breakdowns. Moreover, the construction of these prior devices and their attachment to the tractor have tended to place undesirable strains and stresses on certain areas of the tractor thus tending to increase wear on the tractor unit as a whole.

One of the most common of such prior art devices resides in the concept of simply attaching a bulldozing blade to the front frame or axle of the tractor for mere unsophisticated pushing. With the advent of hydraulic assemblies, however, complex systems were developed for raising and lowering the pushing blade by use of hydraulic power. These systems invariably included a complicated pivotal system operated by hydraulic power to manipulate the blade. This pivotal system also served to support the blade and therefore was required to accept all the stresses and strains encountered by the blade. Moreover, as the bulldozing assembly was mounted on the front of the tractor, the necessarily heavy pivoted arms and hydraulic assembly created an unstable handling condition in the tractor.

It is an object of the present invention to provide a bulldozer assembly for wheeled vehicles such as tractors which obviates the enumerated disadvantages incurred by such devices known heretofore in the art.

It is another object of the present invention to provide a bulldozer attachment for tractors which is simply constructed, easily operated and wherein the entire stress and strain from operation of the blade is placed on the complete frame of the tractor for excellent stability of operation.

It is a further object of the invention to present a novel bulldozer attachment for tractors which includes hydraulic tilting means for effective and simple manipulation of the blade.

One of the primary advantages of the device of the present invention is the provision of an hydraulically operated bulldozer unit which may be quickly and easily attached to, or detached from, the tractor when not in use.

Further advantages which are realized by the novel assembly of this invention reside in the fact that the total blade stress is placed on the rear of the tractor by the attachment of the push arm thereto and control of the tilt of the blade is realized by means of a single hydraulic unit assembly interconnected with a simplified operating arm and pivot system.

Other objects and advantages of the present invention will become apparent as the description thereof proceeds.

In accordance with this invention, the above objects and advantages are realized by the provision of assembly comprising in combination a tractor; a pair of longitudinal push arms pivotally secured at their trailing ends to the frame of the tractor and extending to the front portion thereof; a removably attached bulldozing blade, a pair of vertical blade standards secured to the rearward side of said blade; a pair of operating arms; the lower portions of said blade standards being pivotally attached to the leading ends of said push arms, and the upper portions of said blade standards being pivotally secured to the leading ends of said operating arms; said operating arms being rigidly secured at their trailing ends to a transverse rockshaft, said rockshaft being supported by support members secured to the frame of the tractor; one of said operating arms being further rigidly secured to the forward or lower portion of a rockshaft arm, said rockshaft arm being pivotally attached at its trailing or upper portion to a hydraulic cylinder, the activation of said cylinder serving to control said bulldozing blade by action of the rockshaft arm means.

Also provided by the bulldozing assembly of the invention is a novel hydraulically operated means for tilting of the bulldozer blade which tilting means adapted to be integrally disposed betwen the blade assembly and tractor mounting, the tilting means comprising first and second substantially flat plates disposed in side by side relationship and having means at the corners of each plate to engage the push arms and operating arms on one side and the blade standards on the other; said first plate being pivotally attached to said second plate at one corner thereof, said first plate being further attached to said second plate at approximately the other corners by movable pivots, said first plate further containing pivoted lever means, one end of said lever pivoted to linkage means which in turn is connected to one of said movable pivots, the other end of said lever being pivotally attached to a hydraulic cylinder such that activation of the cylinder will cause said second plate to move about said pivoted corner via the movable pivots, and thus cause the blade to assume a tilting position.

Other objects and advantages of the above construction will be apparent from the following specific description thereof when read in conjunction with the accompanying drawings wherein:

FIGURE 2 illustrates an enlarged side elevational view partly in phantom of the blade and supporting means showing the operation of the manipulating assembly;

FIGURE 3 is a top plan view of the attachment means of this invention showing the operating assembly means and removable blade assembly;

FIGURE 5 represents an enlarged perspective view of the tilting attachment as seen from the rear of the blade; and FIGURE 6 illustrates a plan view of the blade assembly and tilting means as seen along line 6—6 of FIGURE 5.

Figure 1:
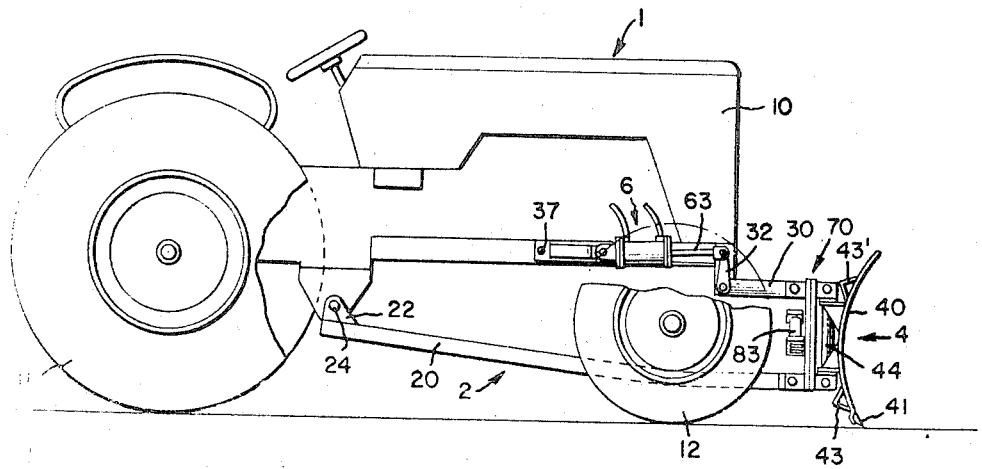
FIGURE 1 is a side elevational view of the attachment of this invention mounted on a conventional wheeled farm tractor.

The bulldozer assembly of the present invention is of the type eminently suitable for use on wheeled tractors such as farming tractors and the like and the following description is limited to this embodiment. However, it is to be understood that the scope of the invention is not to be considered as limited thereto as the assembly is considered applicable to all other similar vehicles.

The assembly of this invention is of the type adapted to be mounted on a tractor or like machine and be capable of moving dirt, refuse and the like from one location to another with a minimum of strain on the tractor and with optimum maneuverability of the bulldozing blade.

Reference is now made in detail to the drawings accompanying this application wherein like reference characters designate like parts.

In FIGURES 1 and 2 wherein side views of the assembly are shown, and FIGURE 3, where a top plan view is illustrated, it will be seen that the assembly in general comprises an hydraulically operated pivot assembly 3, a push means 2 and a bulldozing blade member 4, disposed on a conventional farm tractor 1. The tractor 1 is composed generally of body portion 10, rear wheels 11 and 11' and front wheels 12 and 12'.

The push means, generally designated as 2, comprises identical elongated tubular or flat metal members 20 and 20' which extend from attachment to bulldozing member 4 to the rear of the tractor 1 along the lower portion of the side thereof passing inside the front wheels 12 and 12'. At their forward ends, push arm members 20 are provided with ear portions which are adapted to be pivotally secured to blade assembly 4 by means of conventional pivot pins 5 which form the pivotal connection by mere insertion thereof. The trailing ends of push arm members 20 are provided with angle brackets 22 containing openings or apertures therein for pivotal attachment to the rearward frame portion of the tractor 1 by bolting means 24 or the like. While only a single opening is illustrated in FIGURE 1 at 24 for insertion of the bolt, it is to be understood that several openings may be employed if desired so as to vary the length of the push arms 20 and 20' in order to alter the angle of the blade. Also, while only one of the push members 20 is clearly illustrated in the drawings, it is to be understood that an identical push member 20' is located on the opposite side of the tractor to provide equal pushing means on both sides thereof.

It is to be noted that the push arms are secured to the rear frame of the tractor as opposed to fragile parts such as the axle housing, and extend forwardly inside the front wheels thereof for connection to the blade assembly. Hence, as these push members receive the total stress during the pushing operation, the stresses are transferred directly to the frame of the tractor. This is a particularly advantageous and novel feature of the invention as it prevents breakdowns commonly encountered by prior bulldozing assemblies where the load is placed solely on the bulldozing assembly or some fragile part of the tractor.

Another advantage derived from this push arm structure resides in the fact that, as the push arms pass well inside of the front wheels there is no interference with the steering mechanism of the tractor when performing the bulldozing operation. A common disadvantage of prior art bulldozing tractors is that steering or other parts of the tractor are adversely affected by the complicated apparatus encompassing the front wheels and this defect is overcome by the unit of the present invention.

As pointed out, the identical push arm members 20 and 20' are two in number and are located on either side of the tractor, the forward ends being adapted to pivotally engage the blade or bulldozing member 4 at the lower portion thereof. The bulldozing member 4 in general comprises a standard concave blade member 40 having secured to its lower extremity a standard replaceable cutting edge 41. If desired, the blade may also have secured to one side thereof a conventional wing plate for control of the material being moved, this feature being conventional in the art. Disposed on the rearward side of the blade member 40 are angular bracing means 43 and 43' for strengthening of the blade during the bulldozing operation.

Secured to the rearward side of the blade 40 are a pair of identical blade standards 44 and 45 (see FIGURE 3) which serve to secure the bulldozing member 4 to the push means 3 and pivot assembly 2. The blade standards 44 and 45 are identical in structure and are mounted in a vertical manner on the rearward side of the blade 40 at positions approximating the end portions thereof as indicated in the top view of FIGURE 3. The blade standards are preferably constructed of tubular metal such as pipe of a length less than the width of the blade although other materials may be employed if desired. The standard 44, as shown in FIGURE 2, is constructed of a tubular metal portion 47, such as a short length of pipe disposed within support members or brackets 48 and 48' which in turn are secured to the rearward side of blade 40 by welding or the like. The pipe member 47 is positioned within the brackets so as to rotate freely and thereby enable the blade assembly 4 to turn or pivot to align when sidewise movement of the blade is desired as when a spacer is inserted for angling of the blade.

The pipe member 47 extends through the respective brackets 48 and 48' on either end to provide extending ears 49 and 49' having openings or apertures therein as the means of attachment of the blade standards to the supporting structure mounted on the tractor. The openings or apertures provided in ear portions 49 and 49' provide for simple attachment to the operating assembly 3 and push arms 2 mounted on the tractor by means of conventional pivot pins 5 as described with respect to attachment of the push arms.

The use of conventional pivot pins to secure the blade assembly 4 to the supporting means mounted on the tractor represents another important feature of the invention as it enables the blade to be easily attached to, or detached from the tractor. To mount the blade, the four pivot pins need be merely inserted into the openings provided therefor, thus providing a strong and secure mount. When desiring to employ the tractor for uses other than for bulldozing operations, the four pins are merely removed and the blades detached. Thus, there are no cumbersome and time-consuming mounting problems encountered with the bulldozing unit of this invention.

As pointed out hereinabove, the openings or apertures provided in the extended ear portions of the blade standards 44 and 45 are adapted to be attached to similar ears of extensions disposed at the forward portions of the blade manipulating assembly 3. It is to be noted that the blade attachment mount as shown in the drawings includes a tilting attachment 70, described in detail hereinafter, which joins the sets of extending ear portions by means of lugs. It is to be understood, however, that when the tilting attachment is not in place, the blade may be easily secured by use of double ended lugs and pivot pins or similar apparatus. Thus, the construction illustrated is presented for clarity.

The blade manipulating or operating assembly 3, as depicted most clearly in the side view of FIGURE 2 and top view of FIGURE 3, comprises operating or manipulating arms 30 and 30' which are constructed of a material such as rolled metal in the form of metal bars or similar construction. The operating arms 30 and 30' are provided at their forward ends with ear portions having openings or apertures therein for attachment to the blade standards 44 and 45 by means of conventional pivot pins 5 as delineated hereinabove. Arm 30 is further rigidly secured at its trailing end, as by welding, to rockshaft arm 32 at substantial right angles so as to achieve a rigid lever-type connection at point 33. On the opposite side of the tractor, operating arm 30' is rigidly connected to a transverse rockshaft 34. Rockshaft 34 (see FIGURE 3) extends transversely from a rigid connection 33' at the trailing end of operating arm 30' on one side of the tractor to a rigid connection 33 with operating arm 30 on the opposite side of the tractor. The rigid connections 33 and 33' are preferably achieved by welding means or the like. These rigid connections, when employed with the common rockshaft cause both operating arms 30 and 30' to move simultaneously by manipulation of rockshaft arm 32 as shown in phantom in FIGURE 2. Therefore, with this arrangement, both operating arms can be controlled by a single control means.

Rockshaft 34 is further journaled at its ends and thereby supported by vertical tractor frame-mounted support members 36 and 36' which in turn are secured as by welding to horizontally mounted support members 37 and 37'. These latter support members are mounted on the side of the tractor frame by conventional means such as bolts, or the like, designated generally by reference numeral 38. It will be seen, therefore, that the entire weight of the bulldozing unit is placed solely on the frame of the tractor.

To further provide support for the blade assembly 4, an operating arm reinforcement plate 31 is provided. As seen partly cut away in FIGURE 3, this plate extends transversely from operating arm 30 to arm 30' and serves to aid the rockshaft 34 in imparting sufficient rigidity to the two arms to achieve smooth and simultaneous operation. This reinforcement plate thus is a necessary feature to balance the stresses of the bulldozing operation.

A further feature which adds extreme rigidity and support to the operating assembly 3 at the expense of the frame of the tractor is the positioning of support member 35, called a pivot casting support. This semi-circular support member (FIGURE 3) is journaled at its ends to the end portions of rockshaft 34 and is further rigidly secured at about its midpoint to the lower part of the front of the tractor frame. The part of the frame to which support member may be attached is designated generally by reference numeral 42 in FIGURE 4. Therefore it will be seen that the operating assembly and correspondingly the dozer assembly of the invention are adequately reinforced but without the burden of heavy, cumbersome support members.

Operation of the blade, i.e., raising and lowering, is controlled by the use of a single suitably mounted hydraulic cylinder assembly designated generally by reference numeral 6 (see FIGURES 2 and 3). The cylinder is preferably mounted on support member 37 by means of angle support member 39. The cylinder apparatus 6 is conventional and consists generally of a cylinder 60 pivotally mounted at its rearward end to a near portion of support 39 by means of lug 61 journaled on stud 62. The piston rod 63 of the cylinder is attached to pitman 64 which in turn is secured to lug 65 at its forward end. Lug 65 is pivotally secured to the top portion of upstanding rockshaft arm 32 in alignment with the pivot thereof described hereinabove in such manner that action of the cylinder will move the rockshaft arm forward or backward as desired. The hydraulic cylinder apparatus 6 is further provided with flexible hoses, 66 and 66' for connection to a suitable source of hydraulic supply, such as an ordinary fluid pump (not shown) which is connected to the power takeoff of the tractor (not shown) as is common practice.

Figure 4:
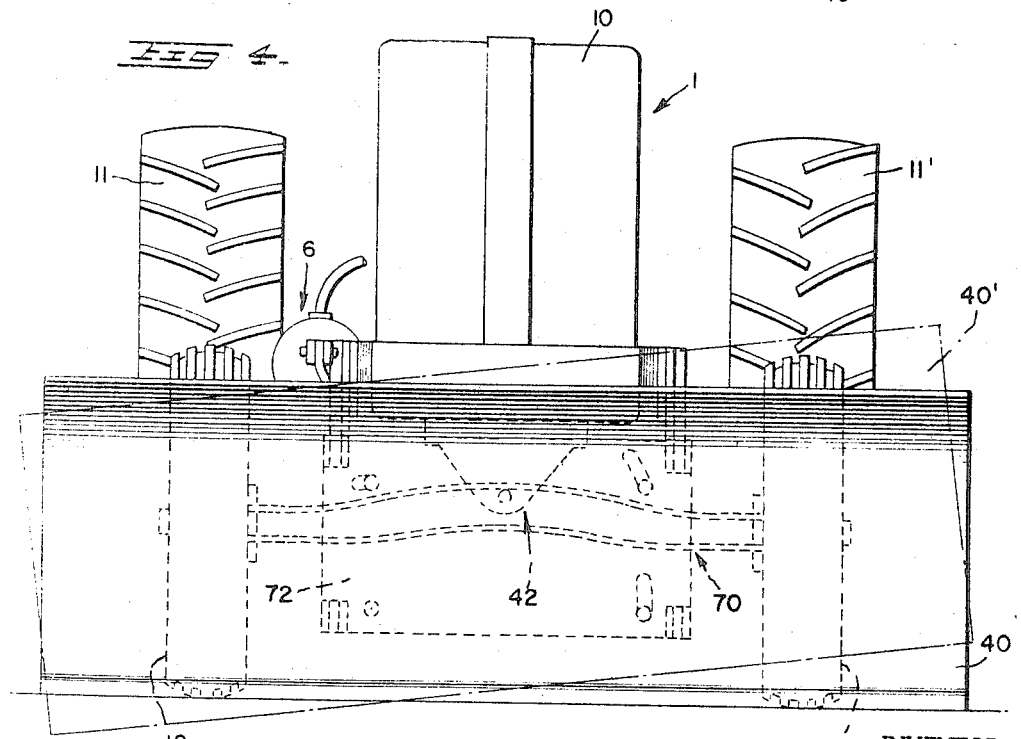
FIGURE 4 is a perspective view of the blade assembly from the front showing the blade tilting means in phantom.

In operation of the blade assembly, fluid may be supplied to and exhausted from the cylinder 60 to move the piston rod 63 forwardly or rearwardly whereby the operating arms 30 and 30' are swung simultaneously by movement of rockshaft arm 32, the operating arms being rigidly secured to rockshaft arm 32 and rockshaft 34. By this simple action blade assembly 4 is raised or lowered by the single hydraulic cylinder. When the piston rod 63 of the hydraulic assembly is moved forwardly and the supply of fluid is cut off, such fluid will be trapped in the cylinder and prevent rearward movement of the rod 63, thus sustaining the dozer blade and preventing the cutter 41 from cutting below the desired grade. By supplying fluid to cylinder 60, the operating arms are swung to elevate the dozer blade to the desired height. The relative positions of the dozer blade are illustrated in FIGURE 4, the elevated position being shown in phantom. Hence, by means of the single hydraulic assembly complete and effective control of the dozer blade is achieved.

It will also be seen that the mounting of the main-support members 36, 36', 37 and 37' in combination with axle pivot casting support member 35 and push arms 20 and 20' comprise one of the primary novel features of the bulldozing assembly of the present invention as each of these identified support members is mounted on the basic frame of the tractor. This is an important feature of the construction of the invention as the strain produced by use of the blade assembly is distributed to the entire frame of the tractor thus eliminating pressure and strain on any of the working or operating parts thereof, such as the axles, steering mechanism, etc. Moreover, as the push arms 20 and 20' extend to, and are pivotally secured to the rear frame of the tractor, the back wheels serve to effect an overall stabilizing influence on the blade assembly when performing its intended function.

A further advantage derived from this novel construction is that the basic supporting and operative members may be permanently mounted on the tractor and do not interfere with the use of the tractor for its other functions, such as in conjunction with farming implements and the like. Furthermore, the blade assembly may be removed from the basic mounting by the mere removal of the four pivot pins which are inserted through cooperative apertures or openings to connect the blade standards to the operating arms and push arms.

As pointed out hereinabove, the blade assembly 4 may be detached from the operating arms 30 and 30' and push arms 20 and 20' merely by the insertion or removal of conventional pivot pins 5 which are disposed in cooperative holes or openings positioned on ear portions in the leading ends of the operating arms and push arms at the top and bottom of the blade standards, respectively, leaving the supporting apparatus permanently secured to the tractor frame. While this feature in itself offers many advantages in the use of such bulldozing apparatus, it also makes advantageous the use of adaptors to render the novel bulldozing assembly of this invention adaptable for varied functions. One of these adaptors is depicted in FIGURES 4, 5, and 6 and is considered as forming an integral part of the invention as a novel embodiment thereof.

The attachment shown in detail in FIGURES 4, 5, and 6 is constructed so as to be insertable between the blade assembly and basic support apparatus as illustrated in FIGURES 1, 2, and 3 and serves to provide novel means for tilting of the blade when desiring to perform work where such positioning of the blade is required.

The tilting attachment is illustrated most clearly in FIGURES 5 and 6 where rearward and top views of the device are shown. The attachment 70 comprises in general a pair of substantially flat plates 71 and 72 of a size such that the lugs or brackets 73, 73', 73" and 73'" on one plate and the lugs or brackets 74, 74', 74" and 74'" on the second plate can be secured to the apertured ears on the operating and push arms and blade standards as described above. The members are secured by means of conventional pivot pins 5 as shown in FIGURE 6. FIGURE 3 illustrates the relative sizes and positioning of plates 71 and 72 which are the basic components of the tilting attachment 70 when in normal position.

Referring again to FIGURES 5 and 6, it will be seen that substantially flat plates 71 and 72 constructed of flat metal, for example, are secured together in substantially face-to-face relationship by a pivot attachment 75 positioned at approximately one corner thereof. The pivot may be formed by conventional means such as by a bolt member 93 journaled through both plates. This is the embodiment illustrated. Plates 71 and 72 are further provided with movable pivot points 76, 77 and 78 at positions more or less at the other three corners of the plates. These pivots, again illustrated by journaled bolt members 94, 95 and 96 extend into and are pivotally secured to plate 72. The openings in plate 71, however, are not merely for reception of the pivotal members but are substantially of an oval shape so as to permit the journaled bolt members 94, 95 and 96 to move or slide freely therein. These oval openings are identified by reference chacacters 79, 80 and 81.

Pivotally secured to one end portion of the rearward plate 71 is a bellcrank lever member 82 which is controlled by hydraulic cylinder 83 for activation of the tilting mechanism. Bellcrank lever member 82 is pivoted at a point 84 intermediate the distance between pivots 76 and 77 by a pivot pin, rivet or the like, and has the longer portion of the bellcrank lever pivotally secured to a clevis 85 on the hydraulic cylinder 83. The shorter portion of the bellcrank lever is pivotally secured to a link 86 which in turn is pivoted at pivot 76 by journaled bolt member 94. Hydraulic cylinder 83 is mounted on plate 71 by a conventional lug and ear pivot assembly at 87 and is comprised of the conventional cylinder with piston rod 88 and fluid hoses 89 and 89' for its operation by conventional means (not shown) such as through connection to the power take-off of the tractor.

Operation of the tilting mechanism is illustrated most graphically in FIGURES 4 and 5. When the cylinder is activated, the extension of the piston rod 88 causes the bellcrank lever 82 to pivot to the position shown in phantom in FIGURE 5 thus causing link 86 to move upwardly through oval opening 79 in plate 71 to position 90. Simultaneously, pivots 77 and 78 will move to the phantom positions 91 and 92, respectively, in the other corners of the plate assembly around stationary pivot 75. As the respective pivots move to the noted positions, the blade 40 assumes the tilted position 40', shown in FIGURE 4 by lifting of plate 72 connected to the blade assembly while plate 71 remains stationary. Deactivation of the cylinder will return the lever 82 to its original position together with pivots 76, 77 and 78 and thereby permit the blade to return to its level or normal position.

It will be understood that the illustrated tilting mechanism may be constructed so as to have the lever and activating mechanism in positions other than as shown, such as by connecting the lever and hydraulic assembly to a different movable pivot than that illustrated. Also, the parts may be arranged so as to tilt either side of the blade to the desired height such as by positioning the movable pivot points for example so that, when in the level positions, these pivots will be at the approximate centers of oval openings 79, 80 and 81, respectively. Other obvious variations will occur to those skilled in the art.

It is also anticipated that other devices may be added to the assembly of this invention without departing from the scope thereof. For example, an extension member or spacer may be placed between the blade standard and operating arm and push arm on one side of the tractor so as to achieve angling of the blade as desired. This is a conventional attachment and may be employed on either side of the blade assembly. The turnable blade standards of the invention are particularly suitable for an attachment of this type.

To reiterate, the bulldozing assembly of the present invention provides a means for carrying out bulldozing operations wherein the entire stress and strain of the work is placed on the basic frame of the tractor. Further, the manipulating apparatus is such that it may be retained permanently on the tractor and not interfere with other normal operations. When not in use, the blade assembly may be quickly detached by the mere removal of the pivot pins and stored as desired. The blade assembly is further effectively operated by a single hydraulic cylinder thus serving to reduce original costs and reducing later breakdown possibilities. Finally, novel means are presented for tilting of the blade as desired, the tilting means being adapted to be retained on the assembly even when no tilting operation is desired. By these several advantages, there is provided a novel bulldozing apparatus which obviates many of the problems of prior art devices.

The foregoing description of the invention is to be considered merely as exemplary thereof. Therefore, various changes in the size, shape and materials of the invention, as well as in the size, shape and materials of the invention may be made without departing from the spirit thereof.

What is claimed is:

1. A bulldozing assembly comprising in combination; a tractor, a removably attached bulldozing blade, a pair of vertical blade standards secured to the rearward side of said blade, said blade standards comprising tubular members disposed within bracket members mounted on said blade in such manner as to rotate freely therein, said tubular members being further provided with first and second connecting portions at the top and bottom thereof, a pair of longitudinal push arms pivotally secured at their trailing ends to the rear frame of said tractor and at their forward ends to said second portions at the bottom of said blade standards; a pair of operating arms pivotally secured at their forward ends to said first portions at the top of said blade standards and rigidly secured at their trailing ends to a transverse rockshaft, one of said operating arms being further rigidly secured at its trailing end to the lower portion of a rockshaft arm; said rockshaft arm being pivotally attached at its upper end to a hydraulic cylinder; the activation of said cylinder serving to control said bulldozing blade by action of the rockshaft arm on said operating arm.

2. A combination according to claim 1 wherein said longitudinal push arms extend to the front portion of said tractor inside the front wheels of said tractor.

3. A combination according to claim 2 wherein said transverse rockshaft is journaled at points approximating its end portions on support members secured to the frame of the tractor.

4. A combination according to claim 3 wherein said rockshaft and operating arms are further supported by a pivot casting support, said pivot casting support being journaled at its ends to the end portions of said rockshaft and rigidly secured at about its mid-point to the lower portion of the front of the tractor frame.

5. A combination according to claim 4 wherein said hydraulic cylinder is mounted on the frame of said tractor in parallel alignment with the tractor engine frame and in alignment with the trailing portion of said rockshaft arm in such manner that thrust pressure from said cylinder causes said bulldozer blade to be raised and lowered.

6. A combination according to claim 5 which includes a rigidly secured horizontal support means extending between said operating arms.

7. A combination assembly according to claim 6 wherein said blade standards are secured to the forward portions of said push arm members and said operating arms by pivot pin means.

8. A combination according to claim 1 wherein said assembly includes means for tilting said bulldozer blade, said tilting means being adapted to be integrally disposed between said bulldozer blade and the support means therefor, said support means comprising the blade standards, push arms and operating arms, said tilting means comprising first and second plates disposed in substantial face-to-face relationship and having engaging means at the corners of each plate to engage the forward portions of said push arms and said operating arms by said first plate, and said blade standards by said second plate; said first plate being attached to said second plate at one corner thereof by a stationary pivot and said first plate being further attached to said second plate at approximately the other corners thereof by movable pivot members, said movable pivot members being mounted on said second plate and adapted to move through suitable openings in said first plate on activation in such manner that said second plate is moved laterally relative to said first plate; said first plate further containing pivoted lever means thereon, one end of said lever being pivoted to linkage means which in turn is pivotally secured to one of said movable pivots, the other end of said lever being pivotally attached to a hydraulic cylinder in such manner that the activation of the cylinder will cause said second plate to move laterally about said stationary pivot and thus cause said blade to assume a tilting position.

9. A combination according to claim 8 wherein said engaging means on said plates are adapted to engage the push arms, operating arms, and blade standards through lug and ear connection by pivot pin means.

10. A combination according to claim 9 wherein said openings in said first plate are substantially oval in shape.

References Cited

UNITED STATES PATENTS

| 2,160,596 | 5/1939 | LeBleu | 172—804 |
| 2,446,136 | 7/1948 | Jarmin | 172—809 |
| 2,224,725 | 12/1940 | Felt. | |
| 2,749,630 | 6/1956 | Nave. | |
| 3,246,406 | 4/1966 | Ray. | |
| 3,296,721 | 1/1957 | Coontz. | |
| 2,967,364 | 1/1961 | Warner et al. | 172—805 |

FOREIGN PATENTS

| 155,899 | 3/1954 | Australia. |
| 1,229,238 | 3/1960 | France. |

ROBERT E. BAGWILL, Primary Examiner

ALAN KOPECKI, Assistant Examiner

U.S. Cl. X.R.

172—809